(12) United States Patent
Suh et al.

(10) Patent No.: US 9,330,057 B2
(45) Date of Patent: May 3, 2016

(54) RECONFIGURABLE PROCESSOR AND MINI-CORE OF RECONFIGURABLE PROCESSOR

(71) Applicant: Samsung Electronics Co., Ltd., Suwon-si (KR)

(72) Inventors: Dong-Kwan Suh, Hwaseong-si (KR); Suk-Jin Kim, Seoul (KR); Hyeong-Seok Yu, Seoul (KR); Ki-Seok Kwon, Seoul (KR); Jae-Un Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 13/711,418

(22) Filed: Dec. 11, 2012

(65) Prior Publication Data

US 2013/0151815 A1 Jun. 13, 2013

(30) Foreign Application Priority Data

Dec. 12, 2011 (KR) ........................ 10-2011-0133197

(51) Int. Cl.
*G06F 15/78* (2006.01)
*G06F 9/38* (2006.01)
*G06F 9/30* (2006.01)

(52) U.S. Cl.
CPC .......... *G06F 15/7867* (2013.01); *G06F 9/3001* (2013.01); *G06F 9/3867* (2013.01)

(58) Field of Classification Search
CPC . G06F 9/3867; G06F 9/3001; G06F 9/30032; G06F 9/30043; G06F 9/3824
See application file for complete search history.

(56) References Cited

U.S. PATENT DOCUMENTS

| | | | |
|---|---|---|---|
| 4,541,046 A * | 9/1985 | Nagashima et al. | 712/3 |
| 8,022,957 B2 | 9/2011 | Ishikawa | |
| 2004/0030871 A1 * | 2/2004 | Schlansker et al. | 712/233 |
| 2004/0054869 A1 | 3/2004 | Igarashi | |
| 2006/0132874 A1 | 6/2006 | Ishikawa | |
| 2009/0070552 A1 * | 3/2009 | Kanstein et al. | 712/29 |
| 2009/0113181 A1 * | 4/2009 | Comparan et al. | 712/215 |
| 2011/0099555 A1 * | 4/2011 | Kwon et al. | 718/108 |

FOREIGN PATENT DOCUMENTS

| | | |
|---|---|---|
| JP | 2005-157653 A | 6/2005 |
| JP | 2006-178546 A | 7/2006 |
| KR | 10-2004-0022706 A | 3/2004 |
| KR | 10-0764898 B1 | 10/2007 |
| WO | WO 93/01545 A1 | 1/1993 |

* cited by examiner

*Primary Examiner* — Farley Abad
(74) *Attorney, Agent, or Firm* — NSIP Law

(57) ABSTRACT

A reconfigurable processor includes a plurality of mini-cores and an external network to which the mini-cores are connected. Each of the mini-cores includes a first function unit including a first group of operation elements, a second function unit including a second group of operation elements that is different from the first group of operation elements, and an internal network to which the first function unit and the second function unit are connected.

15 Claims, 4 Drawing Sheets

RECONFIGURABLE PROCESSOR AND MINI-CORE OF RECONFIGURABLE PROCESSOR

CROSS-REFERENCE TO RELATED APPLICATIONS

This application claims the benefit under 35 USC 119(a) of Korean Patent Application No. 10-2011-0133197 filed on Dec. 12, 2011, in the Korean Intellectual Property Office, the entire disclosure of which is incorporated herein by reference for all purposes.

BACKGROUND

1. Field

The following description relates to a reconfigurable processor.

2. Description of Related Art

Reconfigurable architecture refers to an architecture in which the hardware configuration of a computing device may be changed to optimally perform a task.

When a task is processed only in a hardware manner, it is difficult to efficiently carry out the task once changes occur in the process of the task because of the fixed configuration of the hardware. In contrast, if a task is processed only in a software manner, the task can be processed by reconfiguring the software and changes that occur in the process of a task may be dealt with, but the processing speed is slower than when the data is processed in a hardware manner.

The reconfigurable architecture processes tasks based on both hardware and software advantages. Recently, more attention has been paid on a reconfigurable architecture in the field of digital signal processing that executes the same task iteratively.

One variety of a reconfigurable architecture is a coarse-grained array (CGA). CGA consists of a number of function units that have the same computing power. It is possible to optimize a CGA to a task by controlling the connections between the function units.

SUMMARY

In one general aspect, a reconfigurable processor includes at least one mini-core, and each mini-core of the at least one mini-core includes at least two function units having different respective computing powers.

In another general aspect, a reconfigurable processor includes a plurality of mini-cores and an external network to which the mini-cores are connected. Each of the mini-cores includes a first function unit including a first group of operation elements, a second function unit including a second group of operation elements that is different from the first group of operation elements, and an internal network to which the first function unit and the second function unit are connected.

In another general aspect, a reconfigurable processor includes a first function unit including a first group of operation elements; a second function unit including a second group of operation elements that is different from the first group of operation elements; and an internal network to which the first function unit and the second function unit are connected.

A partial computing power of each of the function units in each of the mini-cores may be defined according to a type of each of at least one operation element included in each of the function units, and a full computing power of each of the mini-cores may be defined by a combination of the partial computing powers of the function units included in each of the mini-cores.

The computing powers of the mini-cores may be different from one another, or may be the same as one another. In addition, the computing powers of at least two function units included in the same mini-core may be different from one another when there is at least one operation element that is not included in all of the function units.

Other features and aspects will be apparent from the following detailed description, the drawings, and the claims.

DETAILED DESCRIPTION

Figure 1:
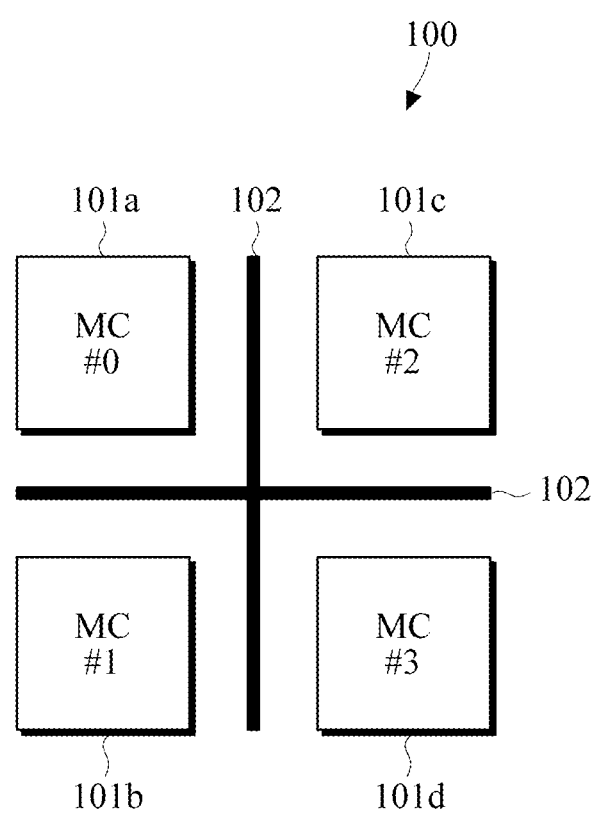
FIG. 1 is a diagram illustrating an example of a reconfigurable processor.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and structures that are well known to one of ordinary skill in the art may be omitted for increased clarity and conciseness.

Throughout the drawings and the detailed description, the same drawing reference numerals refer to the same elements. The relative size and depiction of these elements may be exaggerated for clarity, illustration, and convenience.

FIG. 1 is a diagram illustrating an example of a reconfigurable processor. Referring to FIG. 1, reconfigurable processor 100 includes a plurality of mini-cores 101a, 101b, 101c, and 101d, and an external network 102 to which each of the mini-cores 101a to 101d is connected.

The mini-cores 101a to 101d are capable of performing instructions, jobs, or tasks independently of one another. For example, the mini-cores MC#0 101a and MC#1 101b are capable of concurrently processing two instructions that have no dependence on each other.

Each of the mini-cores 101a to 101d is a basic unit for designing or extending the reconfigurable processor 100. For example, the example illustrated in FIG. 1 shows that there are four mini-cores 101a to 101d, but this is only an example, and the number of mini-cores may be, for example, 8, 16, or any other number.

Each of the mini-cores 101a to 101d has a predetermined amount of full computing power. In the example illustrated in FIG. 1, computing power refers to an operation processing capability, that is, the types of operations a system can process. Thus the computing power of a system may be defined on the basis of the types of operations that can be supported or provided by the system.

For example, it will be appreciated that a system that supports an operation A and an operation B is different in terms of computing power from a system that supports an operation C and an operation D. In addition, it will be appreciated that a system that supports the operations A, B, and C is different in terms of computing power from a system that supports the operations A, B, C, and D, and it will be understood that the latter system has a greater computing power than the former system.

For example, the operations A, B, C, and D in the example illustrated in FIG. 1 may be arithmetic operations, such as addition and multiplication; logical operations, such as logical sum and logical multiply; scalar operations; and vector operations, but the types of the operations A, B, C, and D are not limited thereto.

Each of the mini-cores 101a to 101d may include a plurality of function units that have different computing powers. In other words, the full computing power of each of the mini-cores 101a to 101d may be split among the function units of each of the mini-cores 101a to 101d and mapped to the function units as partial computing powers. For example, the full computing power of the mini-core MC#0 101a may be split among the function units of the mini-core MC#0 101a. Thus, it will be understood that the full computing power of the mini-core MC#0 101a can be defined by the combination of the partial computing powers of the function units of the mini-core MC#0 101a. A detailed configuration of each of the mini-cores 101a to 101d will be described later with reference to FIGS. 2 and 3.

The external network 102 to which the mini-cores 101a to 101d are connected enables the mini-cores 101a to 101d to communicate with one another. For example, data generated by the mini-core MC#0 101a may be delivered to the mini-core MC#3 101d over the external network 102. Each of the mini-cores 101a to 101d may have a plurality of channels through which to transmit and receive data over the external network 102.

The configuration of the external network 102, that is, the connections between the mini-cores 101a to 101d, may be varied by configuration information, which may be stored in a separate memory (not shown).

The full computing powers of the mini-cores 101a to 101d may be the same, or may be different from one other.

Each of the mini-cores 101a to 101d may include a dedicated local register file (LRF) (not shown). Each of the mini-cores 101a to 101d may use its dedicated LRF to push data to the dedicated LRF of another one of the mini-cores 101a to 101d, and may process data pushed to its dedicated LRF by another one of the mini-cores 101a to 101d.

The reconfigurable processor 100 may be configured to operate as a coarse-grained array (CGA) processor, or as a very long instruction word (VLIW) processor. For example, all of the mini-cores 101a to 101d may process loop operations based on a CGA architecture in a CGA mode, and some of the mini-cores 101a to 101d, for example, mini-core MC#0 101a and mini-core MC#2 101c, may process general operations other than loop operations based on a VLIW architecture in a VLIW mode. For mode transition, the reconfigurable processor 100 may include a global register file (GRF) (not shown) to temporarily store live-in/live-out data during mode transitions between the CGA mode and the VLIW mode.

Figure 2:
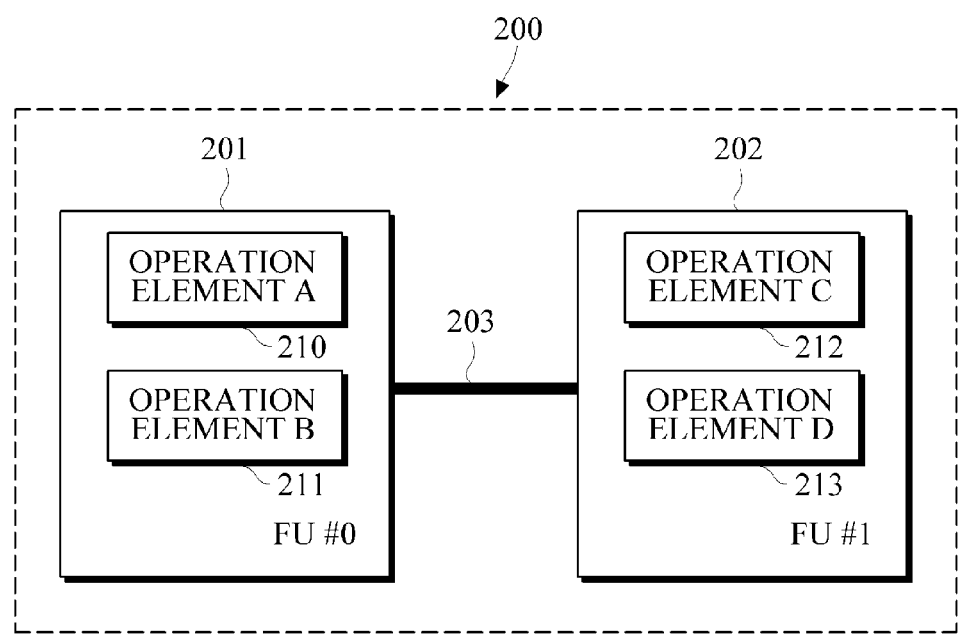
FIG. 2 is a diagram illustrating an example of a configuration of a mini-core.

FIG. 2 is a diagram illustrating an example of a configuration of a mini-core. Referring to FIG. 2, mini-core 200 includes a plurality of function units 201 and 202, and an internal network 203 to which the function units 201 and 202 are connected. The example illustrated in FIG. 2 shows two function units 201 and 202, but the number of function units may be, for example, 4, 8, 16, or any other number. The function units of the mini-core 200 may be scalar function units, or vector function units, or any combination of scalar function units and vector function units.

The function unit 201 includes an operation element A 210 and an operation element B 211, and the function unit 202 includes an operation element C 212 and an operation element D 213. In the example illustrated in FIG. 2, the operation element A 210 may be a circuit or a module to perform an operation A. For example, if the operation A is addition, the operation element A 210 may be an adder.

The function units 201 and 202 may have different computing powers. For example, the function units 201 and 202 may share a full computing power of the mini-core 200. For example, under the assumption that the mini-core 200 has a capability (a full computing power) to perform the operations A, B, C, and D, the function unit FU#0 201 has a capability to perform the operations A and B (a first partial computing power), and the function unit FU#1 202 has a capability to perform the operations C and D (a second partial computing power).

The amount of the partial computing power may be determined according to the type of the operation element included in each function unit. In other words, a type of the operation elements A 210 and B 211 of the function unit FU#0 201 may be different from a type of the operation elements C 212 and D 213 of the function unit FU#1. For example, the function unit FU#0 201 may have a first operation element group consisting of the operation element A 210 and the operation element B 211, and the function unit FU#1 202 may have a second operation element group consisting of the operation element C 212 and the operation element D 213. Not all of the operation elements are necessarily different from one another, and it is sufficient if there is at least one operation element that is not common to the function units 201 and 202, i.e., that is not included in both of the function units 201 and 202. For example, in a case in which the function unit FU#0 201 has the operation elements A 210 and B 211 and the function unit FU#1 202 has the operation elements A 210, B 211, and C 212, the function unit FU#0 201 and the function unit FU#1 202 will have different computing powers.

The internal network 203 to which the function units 201 and 202 are connected enables the function units 201 and 202 to communicate with each other. For example, data generated by the function unit FU#0 201 may be delivered to the function unit FU#1 over the internal network 203.

The configuration of the internal network 203, that is, the connections between the function units 201 and 202, may be varied by configuration information, which may be stored in a separate memory (not shown).

Each of the function units 201 and 202 may include a dedicated local register file (LRF) (not shown). Each of the function units 201 and 202 may use its dedicated LRF to push data to the dedicated LRF of the other one of the function units 201 and 202, and may process data pushed to its dedicated LRF by the other one of the function units 201 and 202.

Figure 3:
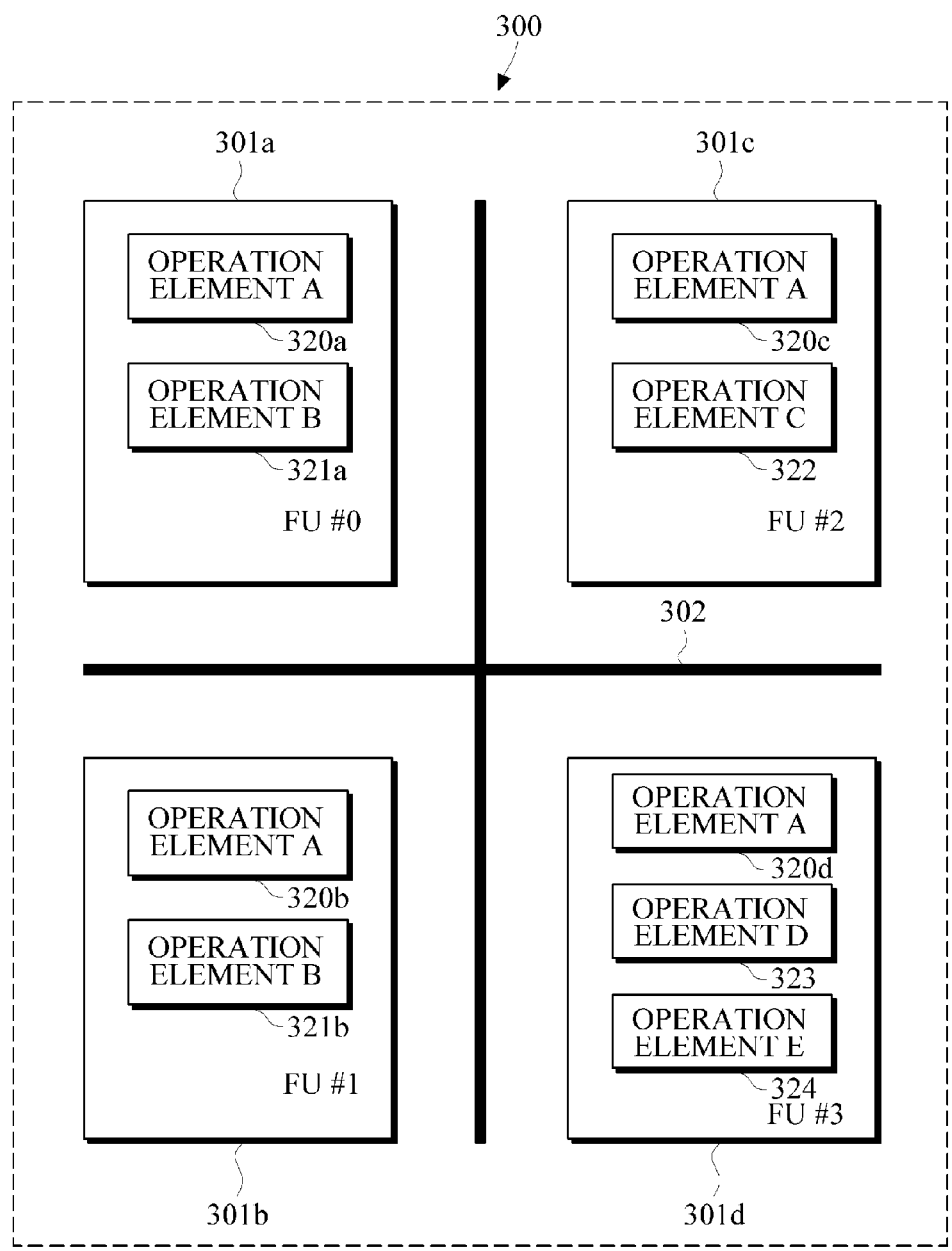
FIG. 3 is a diagram illustrating an example of a configuration of a mini-core.

FIG. 3 is a diagram illustrating another example of a configuration of a mini-core. Referring to FIG. 3, mini-core 300 may include a plurality of function units 301a, 301b, 301c, and 301d, and an internal network 302 to which the function units 301a to 301d are connected. A basic configuration and the internal network 302 of the mini-core 300 are the same as those of the mini-core 200 illustrated in FIG. 2, and thus the detailed description thereof will not be reiterated. The function units 301a to 301d of the mini-core 300 may be scalar function units, or vector function units, or any combination of scalar function units and vector function units.

The mini-core 300 has the capability of processing operations A, B, C, D, and E. In other words, the full computing power of the mini-core 300 corresponds to the operations A, B, C, D, and E.

The full computing power of the mini-core 300 is shared among the function units 301a to 301d of the mini-core 300.

For example, the function unit FU#0 301a includes an operation element A 320a and an operation element B 321a, the function unit FU#1 301b includes an operation element A 320b and an operation element B 321b, the function unit FU#2 301c includes an operation element A 320c and an operation element C 322, and the function unit FU#3 301d includes an operation element A 320d, an operation element D 323, and an operation element E 324.

The mini-core 300 may include at least two different function units that have different computing powers. For example, if the mini-core 300 includes at least one pair of function units with different computing powers and at least one operation element is not common to the functions units, i.e., is not included in all of the function units, the requirements for the mini-core 300 shown in the example illustrated in FIG. 3 will be satisfied.

For example, if some functions units, for example, the function units FU#0 301a and FU#1 301b, have the same computing power, but there is at least one pair of function units that have different computing powers, for example, the function units FU#0 301a and FU#2 301c, the full computing power of the mini-core 300 will be distributed among the functions units 301a to 301d. In addition, even when there is an operation element, for example, the operation element A 320a, that is common to all of the function units 301a to 301d, i.e., that is included in all of the function units 301a to 301d, the full computing power of the mini-core 300 will be distributed among the function units 301a to 301d if at least one other operation element (e.g., the operation element B 321a, the operation element B 321b, the operation element C 322, the operation element D 323, and the operation element E 324) is not common to all of the function units 301a to 301d, i.e., is not included in all of the function units 301a to 301d.

Figure 4:
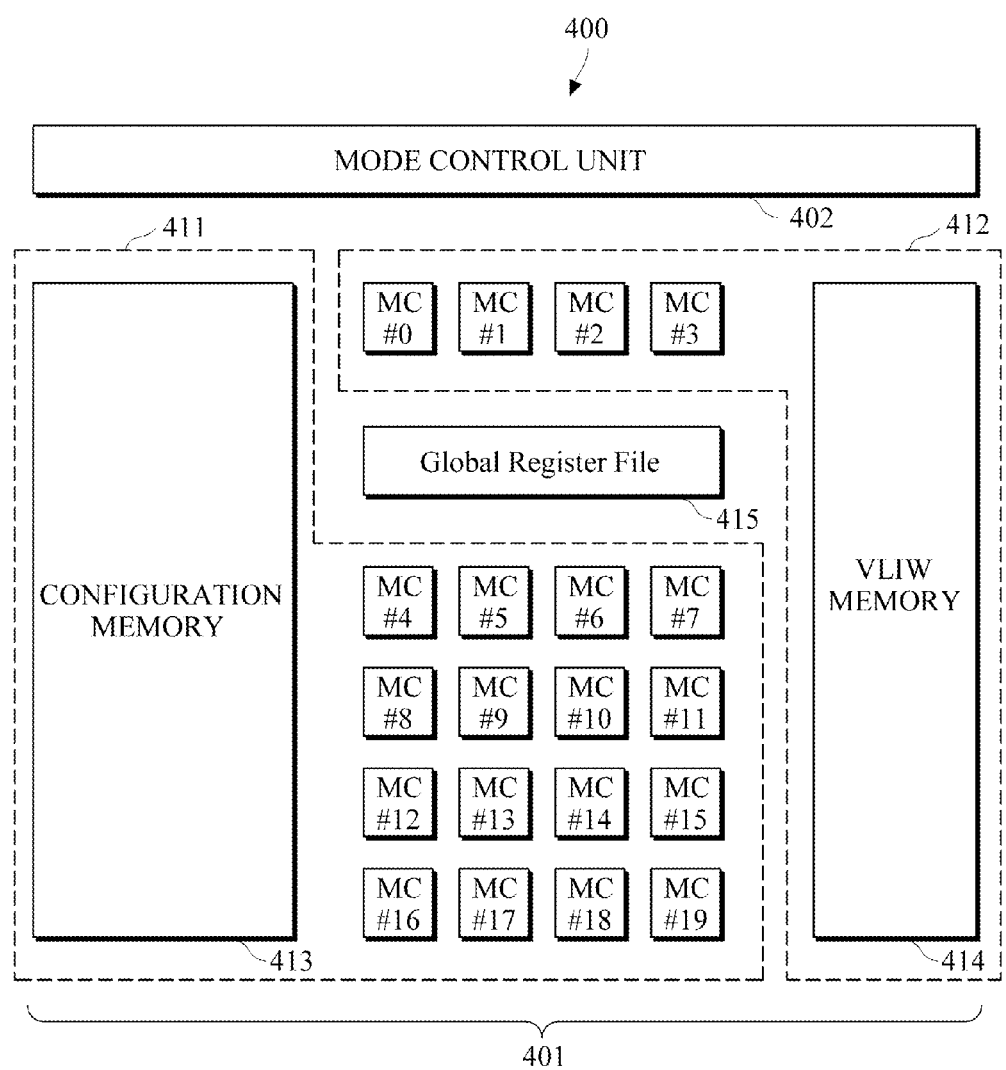
FIG. 4 is a diagram illustrating an example of a reconfigurable processor.

FIG. 4 is a diagram illustrating another example of a reconfigurable processor. Referring to FIG. 4, a reconfigurable processor 400 includes a processing unit 401 and a mode control unit 402.

The processing unit 401 includes a plurality of mini-cores MC#0 to MC#19, and an external network (not shown, but similar to the external network 102 in FIG. 1) to which the mini-cores MC#0 to MC#19 are connected. Each of the mini-cores MC#0 to MC#19 is a basic unit for designing or extending the reconfigurable processor 400 shown in the example illustrated in FIG. 4. The configuration of each mini-core may be the same as the configuration of the mini-cores shown in the examples illustrated in FIGS. 2 and 3.

The processing unit 401 is operable in two modes. For example, the processing unit 401 is operable in a CGA mode for processing a loop operation, and in a VLIW mode for processing operations other than a loop operation.

In the CGA mode, the processing unit 401 operates as a CGA module 411. The CGA module 411 includes 16 mini-cores MC#4 to MC#19 and a configuration memory 413. The configuration memory 413 is connected to the external network (not shown) of the processing unit 401 to enable the mini-cores MC#4 to MC#19 to access the configuration memory 413 over the external network. The mini-cores MC#4 to MC#19 are capable of processing a loop in parallel. Connections between the mini-cores MC#4 to MC#19 or a network configuration may be optimized according to a type of a loop to be processed by the CGA module 411. Configuration information about the structure of the connections between the mini-cores MC#4 to MC#19 or the network configuration is stored in the configuration memory 413. That is, in the CGA mode, the processing unit 401 processes a loop operation based on the CGA module 411 according to the configuration information present in the configuration memory 413. In the CGA mode, each operation may be performed by function units of the mini-cores MC#4 to MC#19, such as the function units shown in FIGS. 2 and 3.

In the VLIW mode, the processing unit 401 operates as a VLIW module 412. The VLIW module 412 includes four mini-cores MC#0 to MC#3 and a VLIW memory 414. The VLIW memory 414 is connected to the external network (not shown) of the processing unit 401 to enable the mini-cores MC#0 to MC#3 to access the VLIW memory 414 over the external network. Each of the mini-cores MC#0 to MC#3 processes very long instructions stored in the VLIW memory 414 according to a VLIW architecture. That is, in the VLIW mode, the processing unit 401 processes an operation based on the VLIW module 412 according to an instruction present in the VLIW memory 414. In the VLIW mode, each operation may be performed by the mini-cores MC#0 to MC#3.

Some mini-cores may be shared in both the VLIW mode and the CGA mode. For example, in the example illustrated in FIG. 4, the mini-cores MC#5 to MC#8, which are used in the CGA module 411, may also operate as a VLIW machine in a VLIW mode.

The mode control unit 402 switches the processing unit 401 from the CGA mode to the VLIW mode and vice versa by generating a mode switch signal or a mode switch instruction. For example, if the processing unit 401 is processing a loop operation in the CGA mode, the processing unit 401 may switch from the CGA mode to the VLIW mode in response to a mode switch signal or mode switch instruction from the mode control unit 402, and then may process an operation other than the loop operation in the VLIW mode. In this case, a result of processing the loop operation, such as live-in/live-out data, which may be referred to as context information, may be temporarily stored in a global register file 415. The global register file 415 is connected to the external network (not shown) of the processing unit 401 to enable the mini-cores MC#4 to MC#19 to access the global register file 415 over the external network. After the processing unit 401 is operating in the VLIW mode, the processing unit 401 may switch back to the CGA mode in response to a mode switch signal or mode switch instruction from the mode control unit 402, and retrieve the context information from the global register file 415 and continue to process the loop operation in the CGA mode that was previously being processed in the CGA mode. The mode control unit 402 may obtain information necessary for the processing 401 to operate in the CGA mode from an operation being processed by the processing unit 401 while operating in the VLIW mode.

As described above, a full computing power of a mini-core is distributed among function units of the mini-core, and a mini-core is designed based on a combination of function units, wherein the mini-core is for use as a basic unit for processing an operation, so that unnecessary consumption of resources in a high-frequency environment can be minimized and the performance of a processor can be increased. In addition, since each mini-core has a full computing power, designing a reconfigurable processor on a mini-core-by-mini-core basis may ensure improved scalability.

A CGA may share resources with a reduced instruction set computer (RISC) processor or a multi-issue processor. When the reconfigurable processor described herein is operated as a CGA processor sharing resources with a multi-issue processor, each issue slot of the multi-issue processor may be formed one of the mini-cores of the reconfigurable processor, or by one of the function units of one of the mini-cores of the reconfigurable processor.

The reconfigurable processor described herein may be used as a processor IP (image processor); in a video system and an audio system; for image processing and 3D graphics processing; in an NV, image, and 3D graphics convergence system; and in cameras, MP3 players, mobile phones, and tablet products. However, these are merely examples, and the reconfigurable processor may be used in any application that will benefit from the advantages provided by the reconfigurable processor described herein.

The mode control unit 402 in FIG. 4 may be implemented using one or more hardware components, one or more software components, or a combination of one or more hardware components and one or more software components.

A hardware component may be, for example, a physical device that physically performs one or more operations, but is not limited thereto. Examples of hardware components include arithmetic elements, operational elements, functional elements, registers, buses, memory devices, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reconfigurable coarse-grained array (CGA) processor comprising:
    at least one mini-core;
    wherein each mini-core of the at least one mini-core comprises at least two function units having different respective computing powers,
    wherein each of the function units comprises at least one operation element configured to perform an operation,
    wherein the operation elements of the function units comprise at least one operation element that is included in at least two of the function units,
    wherein each mini-core of the at least one mini-core constitutes a basic unit for designing or extending the reconfigurable CGA processor, and
    wherein the computing power of each of the function units is defined according to a type of each of the at least one operation element included in each of the function units.

2. The reconfigurable processor of claim 1, wherein the operation elements of the function units further comprise at least one operation element that is not included in all of the function units.

3. The reconfigurable processor of claim 1, wherein each mini-core of the at least one mini-core further comprises an internal network to which the function units are connected.

4. The reconfigurable processor of claim 1, wherein each mini-core of the at least one mini-core has a full computing power that is defined by a combination of respective partial computing powers of the function units.

5. The reconfigurable processor of claim 1, further comprising an external network to which each mini-core of the at least one mini-core is connected.

6. A reconfigurable coarse-grained array (CGA) processor comprising:
    a plurality of mini-cores; and
    an external network to which the mini-cores are connected;
    wherein each of the mini-cores comprises:
        a first function unit comprising a first group of operation elements;
        a second function unit comprising a second group of operation elements that is different from the first group of operation elements; and
        an internal network to which the first function unit and the second function unit are connected,
    wherein the first group of operation elements and the second group of operation elements comprise at least one operation element that is included in both of the first group of operation elements and the second group of operation elements,
    wherein each of the mini-cores constitutes a basic unit for designing or extending the reconfigurable CGA processor,
    wherein the computing power of the first function unit is defined according to a type of each of the at least one operation element included in the first function unit, and
    wherein the computing power of the second function unit is defined according to a type of each of the least one operation element included in the second function unit.

7. The reconfigurable processor of claim 6, wherein the first group of operation elements and the second group of operation elements further comprise at least one operation element that is not included in both of the first group of operation elements and the second group of operation elements.

8. The reconfigurable processor of claim 6, wherein each of the mini-cores has a full computing power; and
    the first function unit and the second function unit each have a partial computing power of the full computing power.

9. The reconfigurable processor of claim 6, further comprising a mode control unit configured to generate a mode control signal to control the mini-cores to switch a coarse-grained array (CGA) mode.

10. The reconfigurable processor of claim 9, wherein when the mini-cores are in the CGA mode, a first group of the mini-cores operate as a CGA processor.

11. The reconfigurable processor of claim 10, wherein none of the mini-cores is included in both the first group of mini-cores and the second group of mini-cores.

12. The reconfigurable processor of claim 10, wherein at least one of the mini-cores is included in both the first group of mini-cores and the second group of mini-cores.

13. The reconfigurable processor of claim 9, further comprising:
    a configuration memory connected to the external network and configured to store configuration information about connections between the first group of mini-cores in the CGA mode; and
    a global register file connected to the external network and configured to store context information of the first group of mini-cores in the CGA mode.

14. A reconfigurable processor comprising:
    a first function unit comprising a first group of operation elements;
    a second function unit comprising a second group of operation elements that is different from the first group of operation elements; and
    an internal network to which the first function unit and the second function unit are connected,
    wherein the first group of operation elements and the second group of operation elements comprise at least one operation element that is included in both of the first group of operation elements and the second group of operation elements,
    wherein the computing power of the first function unit is defined according to a type of each of the at least one operation element included in the first function unit,
    wherein the computing power of the second function unit is defined according to a type of each of the least one operation element included in the second function unit.

15. The reconfigurable processor of claim 14, wherein the first group of operation elements and the second group of operation elements further comprise at least one operation element that is not included in both of the first group of operation elements and the second group of operation elements.

* * * * *